United States Patent [19]

Jackson et al.

[11] Patent Number: 5,146,021

[45] Date of Patent: * Sep. 8, 1992

[54] VI ENHANCING COMPOSITIONS AND NEWTONIAN LUBE BLENDS

[75] Inventors: Andrew Jackson, Princeton; Margaret M. Wu, Belle Mead; Alice S. Chu, Spotswood; Bruce P. Pelrine, Trenton, all of N.J.

[73] Assignee: Mobil Oil Corporation, Fairfax, Va.

[*] Notice: The portion of the term of this patent subsequent to May 2, 2006 has been disclaimed.

[21] Appl. No.: 686,470

[22] Filed: Apr. 17, 1991

[51] Int. Cl.$^5$ ................................ C07C 2/08
[52] U.S. Cl. ........................ 585/10; 585/12; 585/18; 585/520; 585/530
[58] Field of Search ............ 585/530, 520, 10, 12, 585/18

[56] References Cited

U.S. PATENT DOCUMENTS

| | | | |
|---|---|---|---|
| 3,530,077 | 9/1970 | Shepard et al. | 252/442 |
| 4,368,342 | 1/1983 | Slaugh | 585/446 |
| 4,605,810 | 8/1986 | Banks | 585/646 |
| 4,609,769 | 9/1986 | Kukes et al. | 585/646 |
| 4,827,064 | 5/1989 | Wu | 585/10 |
| 4,827,073 | 5/1989 | Wu | 585/530 |
| 4,912,277 | 3/1990 | Aufdembrink et al. | 585/455 |
| 4,914,254 | 4/1990 | Pelrine | 585/530 |
| 5,012,020 | 4/1991 | Jackson et al. | 585/10 |

FOREIGN PATENT DOCUMENTS

| | | |
|---|---|---|
| 3427319A1 | 1/1986 | Fed. Rep. of Germany. |
| 2414543 | 1/1978 | France ................. 585/10 |

OTHER PUBLICATIONS

"Surface Compounds of Transition Metals", Weiss; *Journal of Catalysis*, 424–430 (1984).

*Primary Examiner*—Asok Pal
*Attorney, Agent, or Firm*—Alexander J. McKillop; Charles J. Speciale; Malcolm D. Keen

[57] ABSTRACT

A novel composition is disclosed that is particularly useful as a lubricant viscosity index improver. The composition comprises branched $C_{30}$–$C_{10000}$ hydrocarbons that have a branch ratio of less than 0.19 and viscosity at 100° C. between 725 cS and 15,000 cS. The novel compositions comprise the product of the oligomerization of $C_6$ to $C_{20}$ alpha-olefin feedstock, or mixtures thereof, under oligomerization conditions at a temperature between $-20°$ C. and $+90°$ C. in contact with a reduced valence state Group VIB metal catalyst on porous support. The compositions have viscosities at 100° C. between 725 cS and 15,000 cS. Using the foregoing compositions in admixture with mineral oil and synthetic lubricants provides novel lubricant blends that show an elevated viscosity index. The mixtures also show an increased stability to shear stress at high temperture with all blends notable by exhibiting Newtonian flow.

23 Claims, No Drawings

1

VI ENHANCING COMPOSITIONS AND NEWTONIAN LUBE BLENDS

CROSS-REFERENCE TO RELATED APPLICATIONS

This application is a continuation-in-part of Ser. No. 07/623,840, filed Dec. 7, 1990, which is a continuation-in-part of Ser. No. 07/210,436, filed Jun. 23, 1988 by C. S. H. Chen and M. M. Wu, now U.S. Pat. No. 4,990,711.

This invention relates to novel hydrocarbon oligomer compositions that exhibit superior properties as viscosity index improvement additives for lubricants. The invention also relates to novel alpha-olefin oligomers and lubricant blends produced therefrom with conventional polyalpha-olefins or mineral oil lubricant basestock that show a surprising degree of shear stability and high viscosity index (VI).

BACKGROUND OF THE INVENTION

Synthetic polyalpha-olefins (PAO) have found wide acceptability and commercial success in the lubricant field for their superiority to mineral oil based lubricants. In terms of lubricant property improvement, industrial research effort on synthetic lubricants has led to PAO fluids exhibiting useful viscosities over a wide range of temperature, i.e., improved viscosity index (VI), while also showing lubricity, thermal and oxidative stability and pour point equal to or better than mineral oil. These relatively new synthetic lubricants lower mechanical friction, enhancing mechanical efficiency over the full spectrum of mechanical loads and do so over a wider range of operating conditions than mineral oil. The PAO's are prepared by the polymerization of 1-alkenes using typically Lewis acid or Ziegler catalysts. Their preparation and properties are described by J. Brennan in Ind. Eng. Chem. Prod. Res. Dev. 1980, 19, pp 2–6, incorporated herein by reference in its entirety. PAO incorporating improved lubricant properties are also described by J. A. Brennan in U.S. Pat. Nos. 3,382,291, 3,742,082, and 3,769,363.

In accordance with customary practice in the lubricant arts, PAO's have been blended with a variety of additives such as functional chemicals, oligomers and high polymers and other synthetic and mineral oil based lubricants to confer or improve upon lubricant properties necessary for applications such as engine lubricants, hydraulic fluids, gear lubricants, etc. Blends and their additive components are described in Kirk-Othmer Encyclopedia of Chemical Technology, third edition, volume 14, pages 477–526, incorporated herein in its entirety by reference. A particular goal in the formulation of blends is the enhancement of viscosity index (VI) by the addition of VI improvers which are typically high molecular weight synthetic organic molecules. Such additives are commonly produced from polyisobutylenes, polymethacrylates and polyalkylstyrenes, and used in the molecular weight range of about 45,000 to about 1,700,000. While effective in improving viscosity index, these VI improvers have been found to be deficient in that the very property of high molecular weight that makes them useful as VI improvers also confers upon the blend a vulnerability in shear stability during actual applications. This deficiency dramatically reduces the range of usefulness applications for many VI improver additives. VI enhancers more frequently used are high molecular weight acrylics. Their usefulness is further compromised by cost since they are relatively expensive polymeric substances that may constitute a significant proportion of the final lubricant blend. Accordingly, workers in the lubricant arts continue to search for additives to produce better lubricant blends with high viscosity index. However, VI improvers and lubricant mixtures containing VI improvers are preferred that are less vulnerable to viscosity degradation by shearing forces in actual applications. Preferred liquids are those that exhibit Newtonian behavior under conditions of high temperature and high shear rate, i.e., viscosities which are independent of shear rate. To the extent that such sought after shear stable fluids retain viscosity under high shear stress at high temperature they would provide a significant advantage over conventional mineral oil lubricants or prior art synthetic hydrocarbon (PAO) lubricants. The advantage would be readily demonstrated in applications such as internal combustion engines where the use of a shear stable lubricant under the high temperature, high shear conditions found therein would result in less engine wear and longer engine life. These fluids must also retain, or improve upon, other important properties of successful commercial lubricants such as thermal and oxidative stability.

Recently, novel lubricant compositions (referred to herein as HVI-PAO and the HVI-PAO process) comprising polyalpha-olefins and methods for their preparation employing as catalyst reduced chromium on a silica support have been disclosed in U.S. patent applications Ser. No. 210,434 and 210,435 filed Jun. 23, 1988, incorporated herein by reference in their entirety. The process comprises contacting $C_6$–$C_{20}$ 1-alkene feedstock with reduced valence state chromium oxide catalyst on porous silica support under oligomerizing conditions in an oligomerization zone whereby high viscosity, high VI liquid hydrocarbon lubricant is produced having branch ratios of less than 0.19 and pour point below $-15°$ C. The process is distinctive in that little isomerization of the olefinic bond occurs compared to known oligomerization methods to produce polyalpha-olefins using Lewis acid catalyst. Their very unique structure provides opportunities for the formulation of superior lubricant blends.

Accordingly, it is an object of the present invention to provide novel, high viscosity lubricant compositions having improved viscosity index and shear stability from alpha-olefins that can be utilized as lubricant VI improver additives.

It is a further object of the present invention to provide novel lubricant basestock blends from high viscosity, high viscosity index HVI-PAO in conjunction with synthetic and natural petroleum lubricant.

Another object of the present invention to provide novel lubricant compositions from high viscosity, high viscosity index PAO blends with mineral oil and/or conventional PAO lubricants whereby blends with superior viscosity indices and high temperature shear stability are produced.

Yet another object of the present invention is to provide high VI automotive engine lubricating oils that show Newtonian behavior under conditions of high temperature, high shear stress.

SUMMARY OF THE INVENTION

A novel composition has been discovered that is particularly useful as a lubricant viscosity index improver.

The composition comprises branched $C_{30}$-$C_{10000}$ hydrocarbons that have a branch ratio of less than 0.19 and viscosity at 100° C. between 725 cS and 15,000 cS. The novel compositions comprise the product of the oligomerization of $C_6$ to $C_{20}$ alpha-olefin feedstock, or mixtures thereof, under oligomerization conditions at a temperature between −20° C. and +90° C. in contact with a reduced valence state Group VIB metal catalyst on porous support. The compositions have viscosities at 100° C. between 725 cS and 15,000 cS. The catalyst preparation includes treatment by oxidation at a temperature of 200° C. to 900° C. in the presence of an oxidizing gas and then treatment with a reducing agent at a temperature and for a time sufficient to reduce said catalyst to a lower valence state.

Using the foregoing compositions in admixture with lubricants it has been discovered that the resulting lubricant mixtures or blends show an elevated viscosity index. Surprisingly, the mixtures also show an increased stability to shear stress at high temperature with all blends notable by exhibiting Newtonian flow.

The lubricant mixtures of the instant invention comprise the foregoing novel compositions and liquid lubricant taken from the group consisting essentially of mineral oil, polyolefins and hydrogenated polyolefins, polyethers, vinyl polymers, polyflurocarbons, polychlorofluorocarbons, polyesters, polycarbonates, polyurethanes, polyacetals, polyamides, polythiols, their copolymers, terepolymers and mixtures thereof.

The blends of this invention may also include other additives or additive packages such as antioxidants, dispersants, extreme pressure additives, friction modifiers, detergents, corrosion inhibitors, antifoamants, oxidation inhibitor, pour-point depressant and other VI improvers.

DETAIL DESCRIPTION OF THE INVENTION

In the following description, unless otherwise stated, all references to properties of oligomers or lubricants of the present invention refer as well to hydrogenated oligomers and lubricants wherein hydrogenation is carried out in keeping with the practice well known to those skilled in the art of lubricant production.

In the present invention it has been found that $C_6$-$C_{20}$ alpha-olefins can be oligomerized to provide unique products having high viscosity using the catalyst for the HVI-PAO oligomerization of alpha-olefins referenced hereinbefore. The novel oligomers of the present invention, as with the high viscosity index polyalpha-olefins (HVI-PAO) referenced herein before, are unique in their structure compared with conventional polyalpha-olefins (PAO) from 1-decene and differ from the HVI-PAO oligomers in the cited reference principally in that they are of higher viscosity. A process has been discovered to produce higher viscosity oligomers from $C_6$-$C_{20}$ alpha-olefins that retain the unique structure of HVI-PAO. Polymerization with the novel reduced chromium catalyst described hereinafter leads to an oligomer substantially free of double bond isomerization. Conventional PAO, promoted by $BF_3$ or $AlCl_3$, forms a carbonium ion which, in turn, promotes isomerization of the olefinic bond and the formation of multiple isomers. The HVI-PAO produced in the referenced invention and in this invention has a structure with a $CH_3/CH_2$ ratio <0.19 compared to a ratio of >0.19 for PAO.

It has been found that the process described herein to produce the novel higher molecular weight, or higher viscosity, HVI-PAO oligomers can be controlled to yield oligomers having weight average molecular weight between 15,000 and 200,000 and number average molecular weight between 5,000 and 50,000. Measured in carbon numbers, molecular weights range from $C_{30}$ to $C_{10000}$, with a preferred range of $C_{30}$ to $C_{5000}$. Molecular weight distributions, defined as the ratio of weight averaged molecular to number averaged molecular weight, range from 1.00 to 5, with a preferred range of 1.01 to 4.

Olefins suitable for use as starting material in the invention include those alpha-olefins or 1-alkenes containing from 6 to about 20 carbon atoms such as 1-hexene, 1-octene, 1-decene, 1-dodecene and 1-tetradecene and branched chain isomers such as 4-methyl-1-pentene. Also suitable for use are olefin-containing refinery feedstocks or effluents. However, the olefins used in this invention are preferably alpha olefinic as for example 1-heptene to 1-hexadecene and more preferably 1-octene to 1-tetradecene, or mixtures of such olefins.

Oligomers of alpha-olefins in accordance with the invention have a low branch ratio of less than 0.19 and superior lubricating properties compared to the alpha-olefin oligomers with a high branch ratio, as produced in all known commercial methods.

This new class of alpha-olefin oligomers are prepared by oligomerization reactions in which a major proportion of the double bonds of the alpha-olefins are not isomerized. These reactions include alpha-olefin oligomerization by supported metal oxide catalysts, such as Cr compounds on silica or other supported IUPAC Periodic Table Group VIB compounds. The catalyst most preferred is a lower valence Group VIB metal oxide on an inert support. Preferred supports include silica, alumina, titania, silica alumina, magnesia and the like. The support material binds the metal oxide catalyst. Those porous substrates having a pore opening of at least 40 angstroms are preferred.

The support material usually has high surface area and large pore volumes with average pore size of 40 to about 350 angstroms. The high surface area is beneficial for supporting large amounts of highly dispersive, active chromium metal centers and to give maximum efficiency of metal usage, resulting in very high activity catalyst. The support should have large average pore openings of at least 40 angstroms, with an average pore opening of >60 to 300 angstroms preferred. This large pore opening will not impose any diffusional restriction of the reactant and product to and away from the active catalytic metal centers, thus further optimizing the catalyst productivity. Also, for this catalyst to be used in fixed bed or slurry reactor and to be recycled and regenerated often, a silica support with good physical strength is preferred to prevent catalyst particle attrition or disintegration during handling or reaction.

The supported metal oxide catalysts are preferably prepared by impregnating metal salts in water or organic solvents onto the support. Any suitable organic solvent known to the art may be used, for example, ethanol, methanol, or acetic acid. The solid catalyst precursor is then dried and calcined at 200° to 900° C. by air or other oxygen-containing gas. Thereafter the catalyst is reduced by any of several various and well known reducing agents such as, for example, CO, $H_2$, $NH_3$, $H_2S$, $CS_2$, $CH_3SCH_3$, $CH_3SSCH_3$, metal alkyl containing compounds such as $R_3Al$, $R_3B$, $R_2Mg$, $RLi$, $R_2Zn$, where R is alkyl, alkoxy, aryl and the like. Preferred are CO or H$_2$ or metal alkyl containing compounds. Alternatively, the Group VIB metal may be applied to the substrate in reduced form, such as CrII compounds. The resultant catalyst is very active for oligomerizing olefins at a temperature range from below room temperature to about 500° C. at a pressure of 0.1 atmosphere to 5000 psi. In the instant invention it has been discovered that oligomers with viscosities between 725 cS and 15,000 cS measured at 100° C. can be prepared when the oligomerization reaction is carried out at a temperature between −20° C. and +90° C. Contact time of both the olefin and the catalyst can vary from one second to 24 hours. The catalyst can be used in a batch type reactor or in a fixed bed, continuous-flow reactor.

In general the support material may be added to a solution of the metal compounds, e.g., acetates or nitrates, etc., and the mixture is then mixed and dried at room temperature. The dry solid gel is purged at successively higher temperatures to about 600° for a period of about 16 to 20 hours. Thereafter the catalyst is cooled down under an inert atmosphere to a temperature of about 250° to 450° C. and a stream of pure reducing agent is contacted therewith for a period when enough CO has passed through to reduce the catalyst as indicated by a distinct color change from bright orange to pale blue. Typically, the catalyst is treated with an amount of CO equivalent to a two-fold stoichiometric excess to reduce the catalyst to a lower valence CrII state. Finally, the catalyst is cooled down to room temperature and is ready for use.

The product oligomers have a very wide range of viscosities with high viscosity indices suitable for high performance lubrication use. The product oligomers also have atactic molecular structure of mostly uniform head-to-tail connections with some head-to-head type connections in the structure. These low branch ratio oligomers have high viscosity indices at least about 15 to 20 units and typically 30–40 units higher than equivalent viscosity prior art oligomers, which regularly have higher branch ratios and correspondingly lower viscosity indices. These low branch oligomers maintain better or comparable pour points.

The branch ratios defined as the ratios of CH$_3$ groups to CH$_2$ groups in the lube oil are calculated from the weight fractions of methyl groups obtained by infrared methods, published in *Analytical Chemistry*, Vol. 25, No. 10, p. 1466 (1953).

$$\text{Branch ratio} = \frac{\text{wt fraction of methyl group}}{1 - (\text{wt fraction of methyl group})}$$

Supported Cr metal oxide in different oxidation states is known to polymerize alpha-olefins from C$_3$ to C$_{20}$ (De 3427319 to H. L. Krauss and Journal of Catalysis 88, 424–430, 1984) using a catalyst prepared by CrO$_3$ on silica. The referenced disclosures teach that polymerization takes place at low temperature, usually less than 100° C., to give adhesive polymers and that at high temperature, the catalyst promotes isomerization, cracking and hydrogen transfer reactions. The present inventions produce intermediate molecular weight oligomeric products under reaction conditions and using catalysts which minimize side reactions such as 1-olefin isomerization, cracking, hydrogen transfer and aromatization. To produce the novel intermediate molecular weight products suitable for use as VI improvers with other lube stock, the reaction of the present invention is carried out at a temperature between −20° and +90° C. The catalysts used in the present invention do not cause a significant amount of side reactions.

The catalysts for this invention thus minimize all side reactions but oligomerize alpha-olefins to give intermediate molecular weight polymers with high efficiency. It is well known in the prior art that chromium oxides, especially chromia with average +3 oxidation states, either pure or supported, catalyze double bond isomerization, dehydrogenation, cracking, etc. Although the exact nature of the supported Cr oxide is difficult to determine, it is thought that the catalyst of the present invention is rich in Cr(II) supported on silica, which is more active to catalyze alpha-olefin oligomerization at high reaction temperature without causing significant amounts of isomerization, cracking or hydrogenation reactions, etc. However, catalysts as prepared in the cited Krauss references can be richer in Cr (III). They catalyze alpha-olefin polymerization at low reaction temperature to produce high molecular weight polymers. However, as the references teach, undesirable isomerization, cracking and hydrogenation reaction takes place at higher temperatures needed to produce lubricant products. The prior art also teaches that supported Cr catalysts rich in Cr(III) or higher oxidation states catalyze 1-butene isomerization with 10$^3$ higher activity than polymerization of 1-butene. The quality of the catalyst, method of preparation, treatments and reaction conditions are critical to the catalyst performance and composition of the product produced and distinguish the present invention over the prior art.

In the instant invention very low catalyst concentrations based on feed, from 10 wt % to 0.01 wt %, are used to produce oligomers; whereas, in the cited references catalyst ratios based on feed of 1:1 are used to prepare high polymer.

The following Examples 1 and 2 illustrate the method for the preparation of the catalyst used in alpha-olefin oligomerization to produce HVI-PAO oligomers. The method is also used in the preparation of catalyst for the present invention. Example 2 illustrates method for the modification of a commercially available catalyst to prepare the catalyst of this invention.

EXAMPLE 1

1.9 grams of chromium (II) acetate Cr$_2$(OCOCH$_3$)$_4$.2H$_2$O (5.05 mmole) (commercially obtained) is dissolved in 50 cc of hot acetic acid. Then 50 grams of a silica gel of 8–12 mesh size, a surface area of 300 m$^2$/g, and a pore volume of 1 cc/g, also is added. Most of the solution is absorbed by the silica gel. The final mixture is mixed for half an hour on a rotavap at room temperature and dried in an open-dish at room temperature. First, the dry solid (20 g) is purged with N$_2$ at 250° C. in a tube furnace. The furnace temperature is then raised to 400° C. for 2 hours. The temperature is then set at 600° C. with dry air purging for 16 hours. At this time the catalyst is cooled down under N$_2$ to a temperature of 300° C. Then a stream of pure CO (99.99% from Matheson) is introduced for one hour. Finally, the catalyst is cooled down to room temperature under N$_2$ and ready for use.

EXAMPLE 2

A commercial chrome/silica catalyst which contains 1% Cr on a large-pore volume synthetic silica gel is used. The catalyst is first calcined with air at 800° C. for 16 hours and reduced with CO at 300° C. for 1.5 hours.

As previously described, the reduction step in the preparation of the HVI-PAO catalyst may be carried out with a variety of reducing agents, although carbon monoxide is preferred. In the following Examples 3 and 4, catalyst is prepared using carbon monoxide and hydrogen as reducing agent and 1-hexene is oligomerized to produce the novel composition of the present invention. In both Examples 3 and 4 the oligomerization step is conducted by mixing 1.5 grams of the catalyst with 25 grams of 1-hexene and heating under nitrogen atmosphere to 60° C. for 16 hours. The viscous product is isolated by filtering out the catalyst and distilling off unreacted starting material and low boiling fractions at 100° C. at 0.1 mm Hg. The oligomerization may be conducted at temperatures between −20° C. and 90° C. Table 1 shows the catalyst preparation conditions and the properties of the oligomerization product for Examples 3 and 4.

TABLE 1

| | Example | |
|---|---|---|
| | 3 | 4 |
| catalyst calcined | 800° C./air | 800° C./air |
| catalyst reduction | CO/350° C. | H$_2$/300° C. |
| oligomer yield, wt % | 84 | 12.5 |
| Vis. @ 100° C., cS | 1882 | 737 |
| MW$_n$, × 10$^3$ | 4.53 | 2.9 |
| MW$_w$, × 10$^3$ | 18.75 | 12.5 |
| polydispersity, MW$_w$/MW$_n$ | 4.14 | 4.2 |

The products from the oligomerization reaction contain some unsaturation. However, HVI-PAO with MW$_n$ greater than 8000, or approximately 500 cS for 1-decene-based HVI-PAO, has very low unsaturation as synthesized. Unsaturation can be reduced by hydrogenation in order to improve thermal and oxidative stability of the product.

The results in Table 1 show that high viscosity poly-1-hexene can be produced by the activated chromium on silica catalyst. In a similar manner at a temperature between −20° C. and 90° C. high viscosity oligomer can be prepared for alpha-olefins from C$_7$ to C$_{20}$.

In Table 2 the results of mixing or blending the product obtained in Example 3 with a mineral oil comprising solvent-refined paraffinic neutral 100 SUS basestock is presented. The results show the significant improvement in viscosity and VI achieved in the bled resulting from the novel oligomer of the invention.

TABLE 2

| Weight Percent | | Viscosity, cS | | |
|---|---|---|---|---|
| Ex. 3 Product | Mineral Oil | 100° C. | 40° C. | VI |
| 100 | 0 | 1882.0 | — | — |
| 24.9 | 75.1 | 21.78 | 153.18 | 168 |
| 10.0 | 90.0 | 8.65 | 52.25 | 142 |
| 0 | 100 | 4.19 | 21.32 | 97 |

The following Example 5 demonstrates that mixed alphaolefins can be used as starting material to produce the novel product oligomers of the present invention.

EXAMPLE 5

Three grams of the catalyst from Example 4 is packed in a ⅜" fixed bed reactor and a mixture of alpha-olefins comprising about 17% 1-hexene, 34% 1-octene, 20% 1-decene, 14% 1-dodecene and 15% 1-tetradecene was fed through the reactor at 10 cc per hour at 49° C. and 350 psi. The effluent contained 43.6% lube and 56.4% unreacted starting material which can be recycled for lube production. The lube had the following viscometric properties: Vis. @40° C.=21497 cS, Vis. @100° C.=1552.37 cS, VI=316, pour point +−9° C.

It has been discovered that the high viscosity HVI-PAO oligomers produced in the present invention can be blended with conventional synthetic polyalpha-olefins to formulate cross graded engine oils such as SAE 0W-20, 0W-30, 5W-40 and 5W-50. The incorporation of quantities of high viscosity HVI-PAO comprising between one and forty percent of the overall engine oil formulation produces a cross-graded product that exhibits a high viscosity index. It has further been discovered that the aforenoted blends are Newtonian at the high temperature (150° C.) and high shear rate (one million reciprocal seconds)—HTHSR—conditions commonly encountered in internal combustion engine bearings and currently standardized in high shear rate tests such as the Tannas Tapered Bearing Simulator (TBS)—ASTM D4683—and used in European CCMC engine oil specifications.

Newtonian SAE 5W-50 versions of high performance synthetic engine oil are produced for example with about 20% of 1046 cS @100° C. or 1073 cS @100C HVI-PAO. These novel oils have HTHSR viscosities between 5.7 and 6.2 cP compared to HTHSR viscosities of 4.0 cP for commercially available high performance SAE 5W-50 synthetic engine oils. Accordingly, the novel engine oil formulations incorporating high viscosity HVI-PAO can provide better engine protection than the best currently available commercial products of equivalent SAE cross grade.

A Newtonian SAE 0W-30 version is produced with 11.5% of 1073 cS @100C HVI-PAO. This oil has an HTHSR viscosity of 3.7 cP, exceeding the current lower limit of 3.5 cP set in Europe by CCMC. This limit can currently only be met by SAE 5W-30 synthetic formulations and SAE 0W 40 mineral oil formulations. Accordingly, the above type of novel SAE 0W-30 engine oil formulation incorporating high viscosity HVI-PAO can provide engine protection equivalent to those mineral and synthetic engine oils which meet current minimum European HTHSR viscosity requirements while providing considerably improved fuel economy and better low temperature performance.

Further, a Newtonian SAE 0W-20 version is produced with 8.4% of 1073 cS HVI-PAO. This oil has an HTHSR viscosity of 3.0 cP, exceeding current US engine builders informally imposed lower HTHSR viscosity limits of 2.6–2.9 cP. Such a formulation incorporating high viscosity HVI-PAO would provide adequate engine protection in US built cars while providing considerably improved fuel economy and better low temperature performance compared with current commercial products meeting the same HTHSR requirement.

The novel engine oil formulations of the present invention include, in addition to high viscosity HVI-PAO, synthetic PAO as commercially obtained from the oligomerization of 1-decene with BF$_3$ or AlCl$_3$. However, other lubricants may be used in addition to PAO or in substitution thereof. The formulations also include a typical, commercial additive package consisting of esters and such additives as antioxidants, ashless dispersants and antiwear agents. For the synthetic oils above, the additive package comprises about 33% of the formulation. In mineral oil based formulations, the concentration would generally be lower. The beneficial results of the blends of the present invention can be realized using HVI-PAO from 100 cS to 20000 cS at 100C and the blends can include between 1 and 40% of the novel HVI-PAO. To those skilled in the art of lubricant formulation it is known that higher molecular weight, i.e. higher viscosity HVI-PAO, may be used at lower concentrations to achieve the VI improvement desired. But this consideration in formulation must be weighed against any possible loss in shear stability that generally accompanies the use of higher molecular weight VI improver, such as HVI-PAO.

The following Table 3 presents formulations for SAE viscosity grades OW-20, OW-30 and 5W-50 of synthetic engine oil incorporating the HVI-PAO of the present invention. From the HTHSR dynamic viscosity results it is evident that the Tannas TBS (ASTM D4683) and Cannon Capillary (ASTM D 4624) Viscometer results are equivalent. It can also be seen that for all the examples, the high shear rate dynamic viscosity equals the low shear rate dynamic viscosity, determined from the product of kinematic viscosity measured at 150° C. and the density projected to 150° C. by the API method from room temperature measurements, and hence these formulations are Newtonian at the HTHSR conditions.

Although the HVI-PAO examples cited are of synthetic engine oils, it should be understood that the same formulation principles can be applied to any lubricant where a high VI is required with no loss of viscosity due to shear, such as hydraulic oils, aviation oils, gear oils, turbine oils, circulating oils, and the like.

Although the wide cross grades such as SAE 5W-50 and OW-30 can only be made with high VI starting basestocks such as PAO, ester, polyglycol and XHVI mineral oils, lower crossgrades can be made with basestocks of lower VI such as conventional mineral oils and these will in turn have improved shear stability over their counterparts made by conventional VI-improver techniques.

Among the lubricant base stocks with which the present VI improvers may be used are the high viscosity index lubricants of mineral oil origin produced by the hydrocracking of petroleum waxes, referred to herein as XHVI lubricants. These lubricant basestocks are derived from waxes which are separated from oils during conventional solvent dewaxing processes, especially from lubricating oil stocks including both neutral (distillate) and residual stocks. In the process for converting the waxes to the XHVI lubestocks, the separated wax is subjected to hydrocracking at high pressure, typically at 1500-3000 psig, over an amorphous catalyst such as alumina containing a metal component, usually a base metal component such as nickel/tungsten. Processes of this kind and the products obtained are described, for example, in British Patents Nos. 1390359, 1545828, 1324034, 1429291, 1429494, to which reference is made for a detailed description of such processes and their products.

TABLE 3

| | SAE Viscosity Grade | | |
| --- | --- | --- | --- |
| | 5W-50 | | OW-20 | OW-30 |
| 1046 cS HVI-PAO | 21% | 19% | — | — | — |
| 1073 cS HVI-PAO | — | — | 21% | 8.4% | 11.5% |
| PAO | 45.9% | 47.9% | 45.9 | 58.5% | 55.4% |
| Additive Package | 33.1% | 33.1% | 33.1% | 33.1% | 33.1% |
| cS @ 40° C. | 100 | 87 | 100 | 40 | 51 |
| cS @ 100° C. | 18.9 | 16.7 | 18.8 | 8.4 | 10.4 |
| VI (ASTM D2270) | 212 | 210 | 210 | 193 | 200 |
| CCS*2 @ −25° C., P | 34.5 | 30.5 | — | — | — |
| CCS @ −30° C., P | — | — | — | 21.5 | 28.3 |
| HTHSR, cP (Can-non)*3 | 6.2 | 5.7 | — | 3.0 | 3.7 |
| HTHSR, cP (Tannas TBS)*4 | 6.2 | 5.5 | — | — | — |
| Calc. HTHSR*1 cP | 6.3 | 5.6 | — | 3.0 | 3.7 |
| Noack Volatility | — | — | 11.2% | — | — |

*1 the product of kinematic viscosity measured at 150° C. and density projected to 150° C. per API method.
*2 Cold Crank Simulator (ASTM D2602 MOD).
*3 (ASTM D4624).
*4 (ASTM D4683).

In the case of blends of PAO with HVI-PAO as disclosed herein, the basestock PAO component is obtained from commercial sources such as MOBIL Chemical Co. The commercial material is typically prepared by the oligomerization of 1-alkene in the presence of promoted borontrifluoride, aluminum chloride or Ziegler catalyst and is characterized by having a branch ratio greater than 0.19 and viscosity indices significantly lower than HVI-PAO. Other liquid lubricants useful as blending components with HVI-PAO in the present invention include lubricant grade mineral oil from petroleum. Yet other useful HVI-PAO blending components include unsaturated and hydrogenated polyolefins such as polybutylene and polypropylene, liquid ethylene-propylene copolymer and the like; vinyl polymers such as polymethylmethacrylate and polyvinylchloride; polyethers such as polyethylene glycol, polypropylene glycol, polyethylene glycol methyl ether; polyflurocarbons such as polytetrafluroethylene and polychloroflurocarbons such as polychlorofluroethylene; polyesters such as polyethyleneterephthalate and polyethyleneadipate; polycarbonates such as polybisphenol A carbonate; polyurethanes such as polyethylenesuccinoylcarbamate; silicones; polyacetals such as polyoxymethylene; polyamides such as polycaprolactam. The foregoing polymers include copolymer thereof of known composition exhibiting useful lubricant properties or conferring dispersant, anticorrosive or other properties on the blend. In all cases, blends may include other additives.

The present invention has been described with preferred embodiments. However, modifications and variations may be employed and are considered to be within the purview and scope of the appended claims.

What is claimed is:

1. A lubricant mixture having enhanced viscosity index and shear stability, comprising;
   branched $C_{30}$–$C_{10000}$ hydrocarbons having a branch ratio of less than 0.19 and viscosity at 100° C. between 725 cS and 20,000 cS; and liquid lubricant taken from the group consisting of mineral oil, polyolefins and hydrogenated polyolefins and mixtures thereof.

2. The lubricant mixture of claim 1 wherein said branched hydrocarbons have a weight average molecular weight between 15,000 and 200,000, number average molecular weight between 5000 and 50,000, molecular weight distribution between 1 and 5, and viscosity index grater than 130.

3. The lubricant mixture of claim 1 wherein branched hydrocarbons comprise the hydrogenated polymeric or copolymeric residue of linear 1-alkenes comprising $C_6$ to $C_{20}$ 1-alkenes.

4. The lubricant mixture of claim 3 wherein said 1-alkenes comprise 1-decene.

5. The lubricant mixture of claim 1 wherein said mineral oil comprises petroleum hydrocarbons, said polyolefins or hydrogenated polyolefins comprise polyisobutylene, polypropylene and polyalpha-olefins with a branch ratio grater than 0.19, said vinyl polymers comprise polymethylmethacrylate and polyvinylchloride, said polyethers comprise polyethylene glycol, said polyesters comprise polyethyleneadipate.

6. A lubricant mixture according to claim 1 wherein said mixture comprises between 1 and 40 weight percent of said branched hydrocarbons.

7. A lubricant mixture having enhanced viscosity index and high temperature shear stability, comprising;
   i. the product of the oligomerization of $C_6$ to $C_{20}$ alpha-olefin feedstock, or mixtures thereof, under oligomerication conditions at a temperature between $-20°$ C. and $90°$ C. in contact with a reduced valence state Group VIB metal catalyst on porous support, said product having viscosity at $100°$ C. between 725 cS and 20,000 cS; wherein said catalyst has been treated by oxidation at a temperature of $200°$ C. to $900°$ C. in the presence of an oxidizing gas and then by treatment with a reducing agent at a temperature and for a time sufficient to reduce said catalyst to a lower valence state; and
   ii. liquid lubricant taken from the group consisting of mineral oil, polyolefins and hydrogenated polyolefins and mixtures thereof.

8. The mixture of claim 8 wherein said mineral oil comprises petroleum hydrocarbons, said polyolefins or hydrogenated polyolefins comprise polyisobutylene, polypropylene and polyalpha-olefins with a branch ratio greater than 0.19.

9. The mixture of claim 8 wherein said polyalpha-olefins comprise the product of the polymerization of alpha-olefins with Lewis acid or Ziegler catalyst.

10. The lubricant mixture of claim 7 further comprising lubricant additives taken from the group consisting of antioxidants, dispersants, extreme pressure additives, friction modifiers, detergents, corrosion inhibitors, antifoamants and VI improvers.

11. Newtonian lubricant oil composition for internal combustion engines comprising a mixture comprising;
   branched $C_{30}$–$C_{10000}$ hydrocarbons having a branch ratio of less than 0.19 and viscosity at $100°$ C. between 725 cS and 20,000 cS and liquid lubricant, said mixture exhibiting shear stability under high temperature, high shear rate conditions of a temperature of $150°$ C. and shear rate of one million reciprocal seconds.

12. The composition of claim 11 wherein said branched hydrocarbons have a viscosity at $100°$ C. of from 725 to 2000 cS.

13. The composition of claim 11 wherein said liquid lubricant comprises the oligomerization product of 1-alkenes in contact with oligomerization catalyst, said catalyst comprising Lewis acids and Ziegler catalyst.

14. The composition of claim 11 wherein said liquid lubricant comprises mineral oil.

15. The composition of claim 11 wherein said liquid lubricant comprises XHVI liquid lubricant.

16. The composition of claim 11 wherein said hydrocarbons comprise the oligomerization product of $C_6$ to $C_{20}$ alpha-olefin feedstock, or mixtures thereof, under oligomerization conditions at a temperature between $-20°$ C. and $90°$ C. in contact with a reduced valence state Group VIB metal catalyst on porous support, said hydrocarbons having viscosity at $100°$ C. between 100 cS and 20,000 cS; wherein said catalyst has been treated by oxidation at a temperature of $200°$ C. to $900°$ C. in the presence of an oxidizing gas and then by treatment with a reducing agent at a temperature and for a time sufficient to reduce said catalyst to a lower valence state.

17. The composition of claim 16 wherein said alpha-olefin feedstock comprises 1-decene.

18. The composition of claim 16 comprising SAE 5W-50 engine oil containing about 20% of said hydrocarbons having a viscosity between about 1045 and 1075 cS at $100°$ C.

19. The composition of claim 16 comprising SAE 0W-20 engine oil containing about 8.5% of said hydrocarbons having a viscosity of about 1073 cS at $100°$ C.

20. The composition of claim 16 comprising SAE 0W-30 engine oil containing about 11.5% of said hydrocarbons having a viscosity of about 1073 cS at $100°$ C.

21. The composition of claim 16 wherein said hydrocarbons have a viscosity at $100°$ C. less than 2000 cS.

22. The composition of claim 16 wherein said catalyst comprises CO reduced chromium oxide on silica support.

23. A viscosity index improver for lubricating oils comprising a high molecular weight olefin polymer which increases the viscosity index of lubricant basestock by at least thirty numbers when added in an amount not more than ten weight percent, wherein said improver has a weight average molecular not greater than 20,000.

* * * * *